(12) United States Patent
Schmidt et al.

(10) Patent No.: US 7,014,327 B2
(45) Date of Patent: Mar. 21, 2006

(54) RELEASABLE MOUNTING ARM FOR A VEHICLE MIRROR

(75) Inventors: William Schmidt, Newport, MI (US); Daniel Swain, Southgate, MI (US)

(73) Assignee: Mirror Lite Company, Rockwood, MI (US)

( * ) Notice: Subject to any disclaimer, the term of this patent is extended or adjusted under 35 U.S.C. 154(b) by 6 days.

(21) Appl. No.: 10/269,737

(22) Filed: Oct. 11, 2002

(65) Prior Publication Data

US 2003/0103282 A1 Jun. 5, 2003

Related U.S. Application Data

(60) Provisional application No. 60/329,248, filed on Oct. 12, 2001.

(51) Int. Cl.
*G02B 5/08* (2006.01)
*G02B 7/18* (2006.01)

(52) U.S. Cl. ........................ 359/841; 248/476; 248/900

(58) Field of Classification Search ................ 359/841, 359/872, 876, 881; 248/476, 549, 900
See application file for complete search history.

(56) References Cited

U.S. PATENT DOCUMENTS

| | | | | | |
|---|---|---|---|---|---|
| 4,436,372 | A | * | 3/1984 | Schmidt et al. | .............. 359/868 |
| 5,061,056 | A | * | 10/1991 | You | ............................ 359/872 |
| 5,477,391 | A | * | 12/1995 | Boddy | ........................ 359/841 |
| 6,369,702 | B1 | * | 4/2002 | Lang | ............................ 340/436 |
| 6,431,713 | B1 | * | 8/2002 | Phillips | ....................... 359/850 |
| 6,598,983 | B1 | * | 7/2003 | Boddy | ........................ 359/841 |

* cited by examiner

*Primary Examiner*—Mark A. Robinson
(74) *Attorney, Agent, or Firm*—John S. Artz; Artz & Artz, PC

(57) ABSTRACT

A vehicle mirror assembly includes a mounting bracket for attachment of the mirror assembly to a vehicle. The bracket is in communication with a mounting arm at a first end thereof. The mounting arm has a second end that is in communication with a mirror. The mirror assembly includes at least one release mechanism that allows the mounting arm to pivot with respect to the bracket when the mounting arm is subject to a force of at least a predetermined threshold.

17 Claims, 6 Drawing Sheets

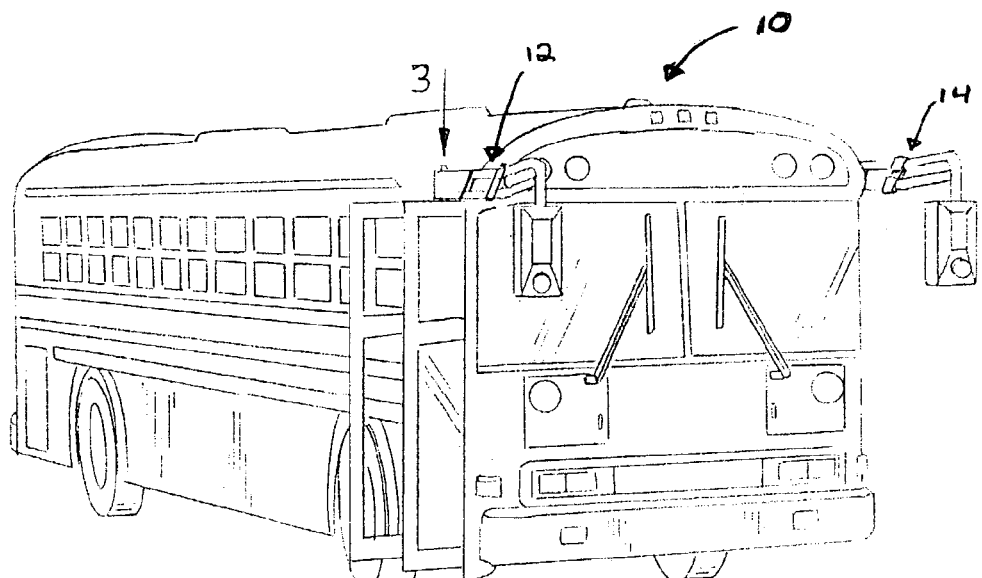
FIG. 1
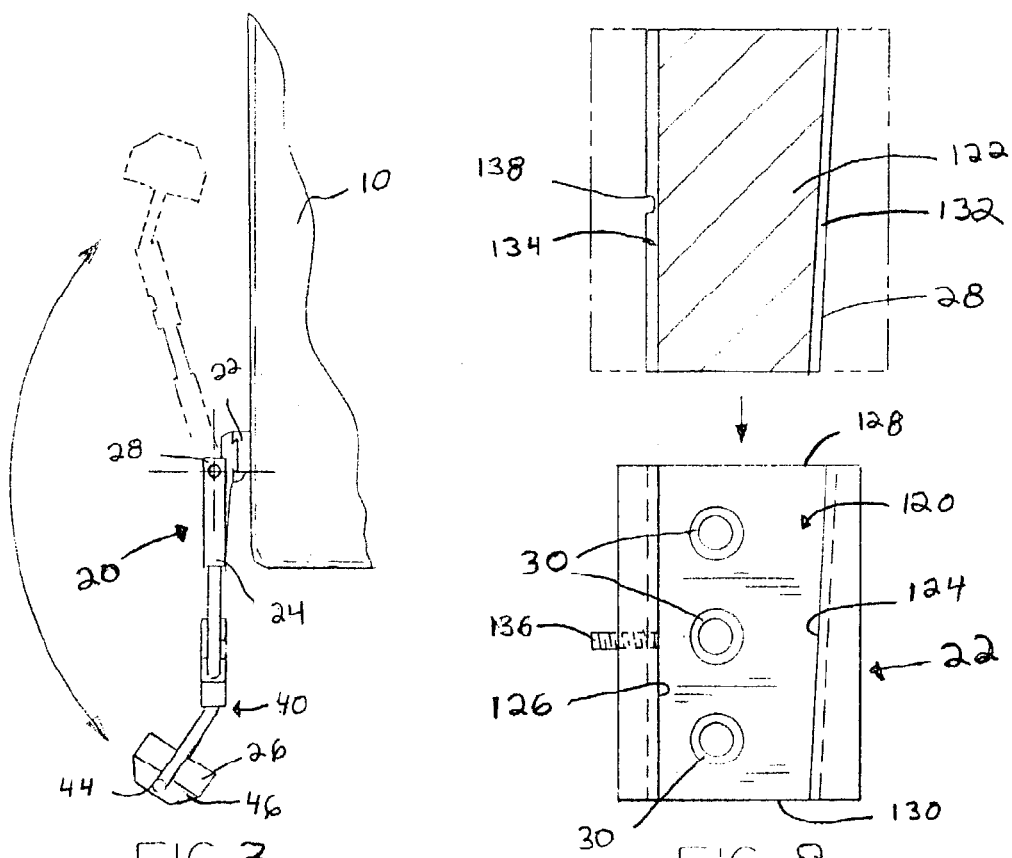
FIG. 3
FIG. 8

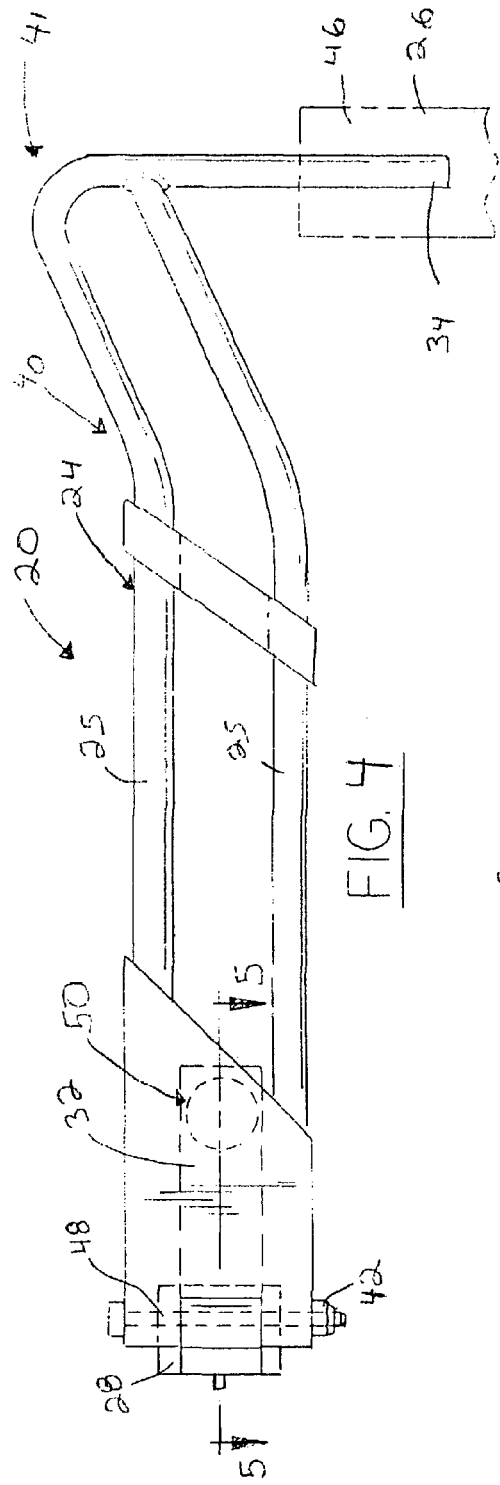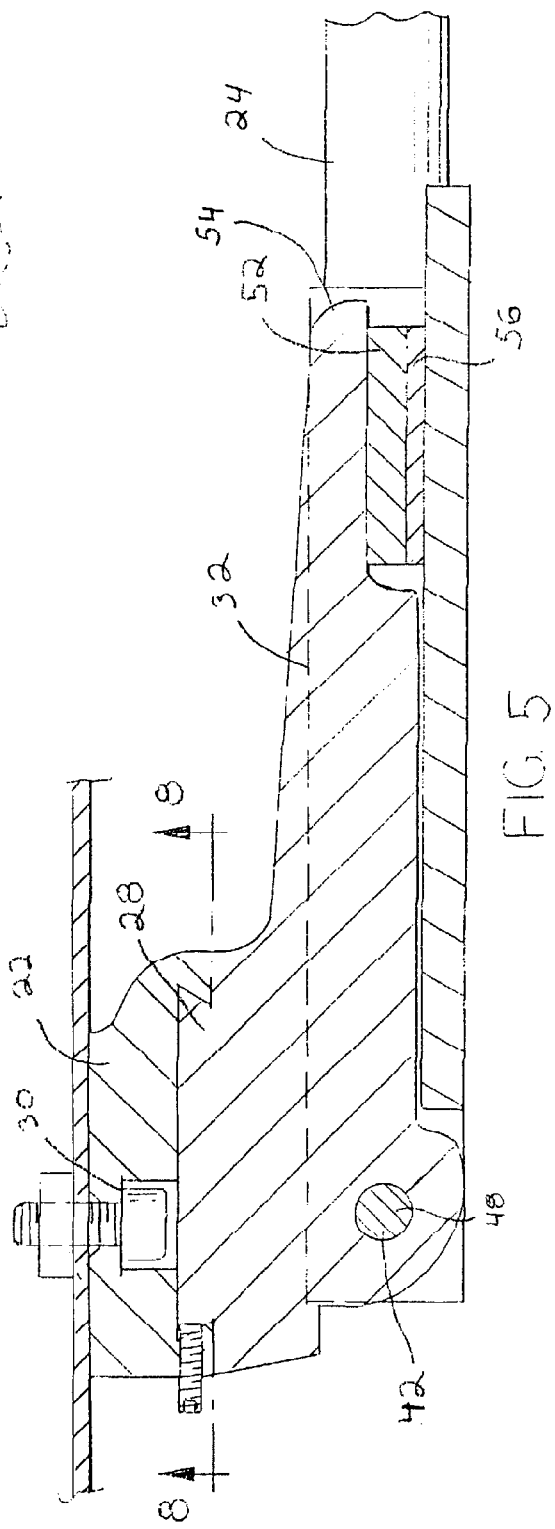

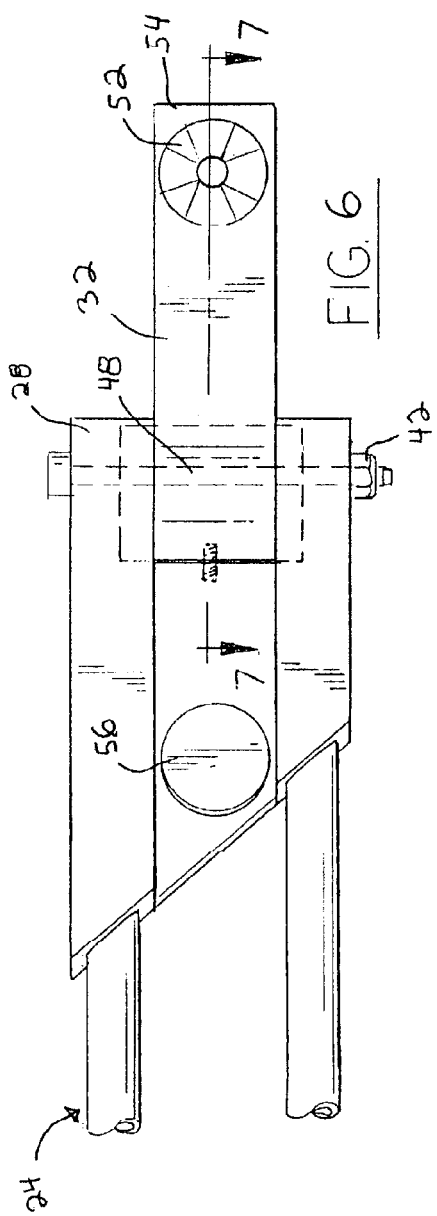
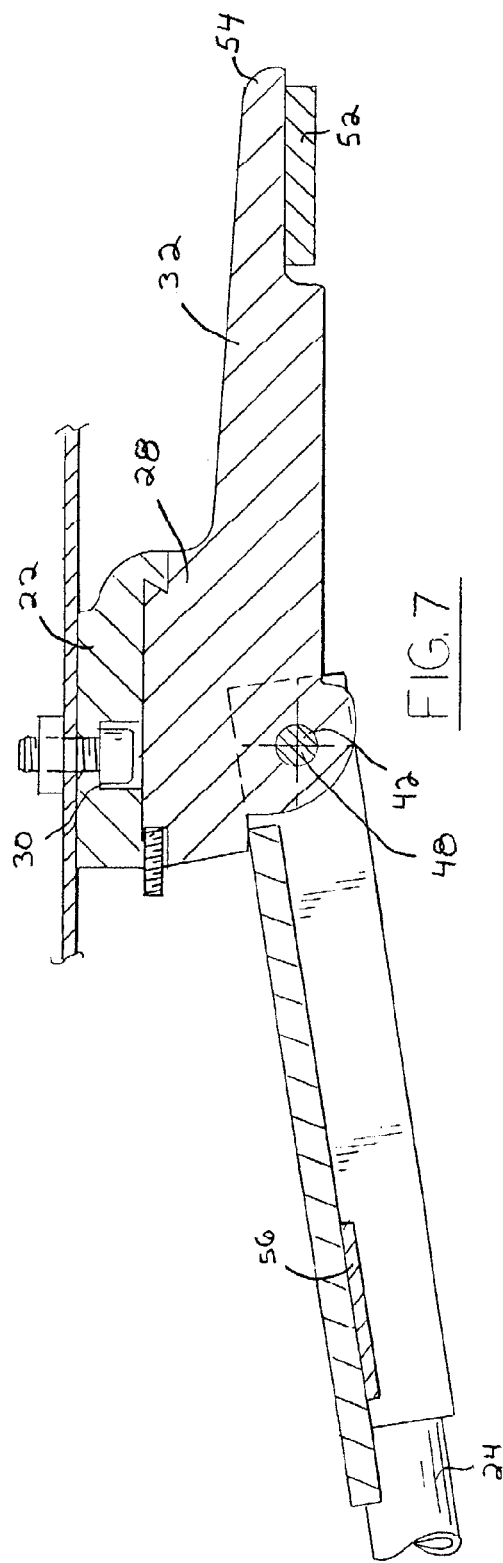

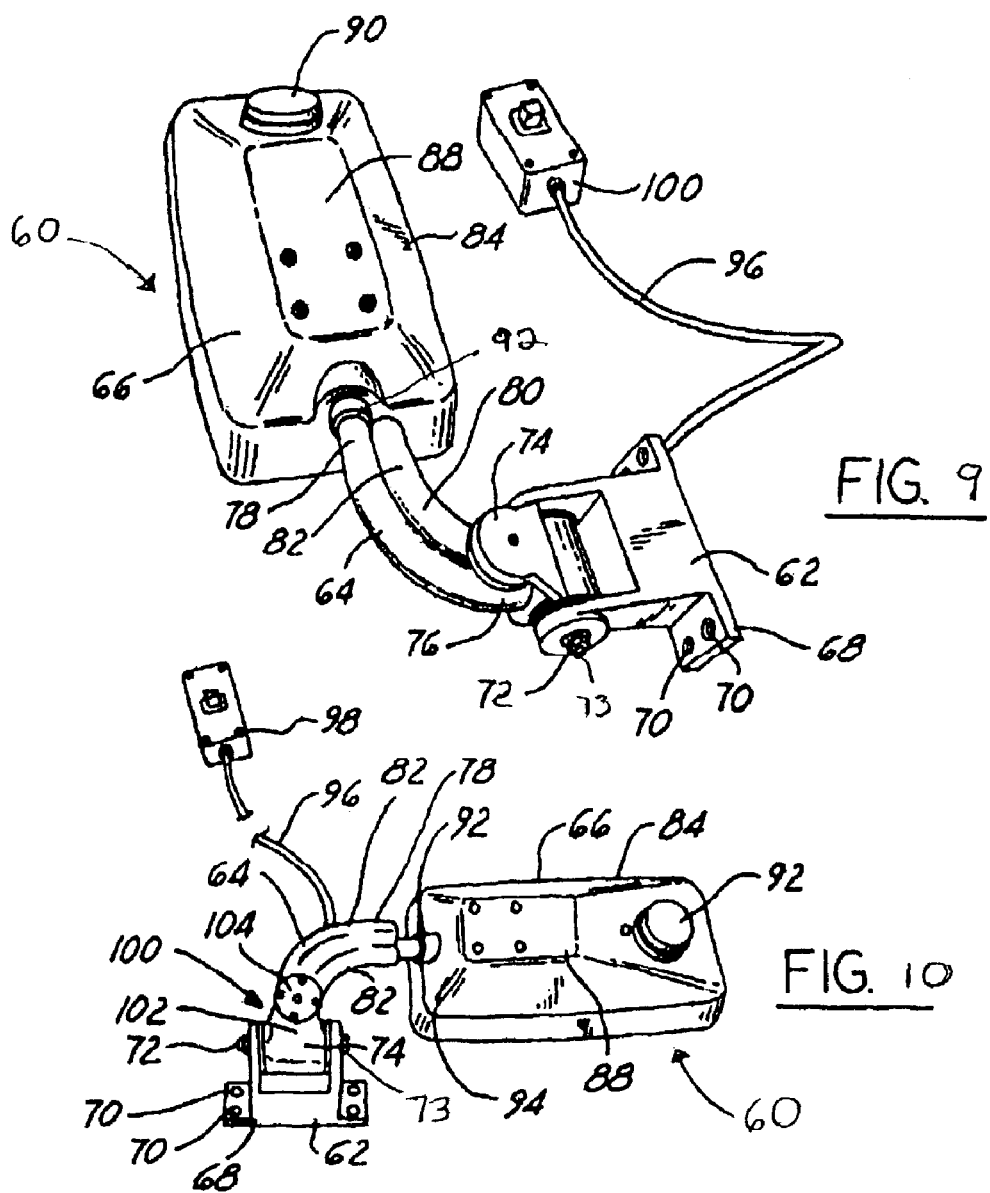
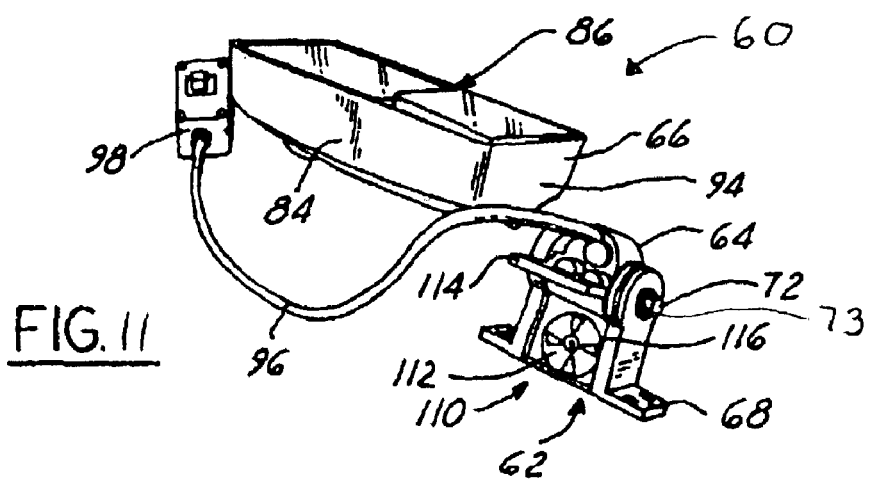

RELEASABLE MOUNTING ARM FOR A VEHICLE MIRROR

CROSS-REFERENCE TO RELATED APPLICATIONS

The present invention claims priority from co-pending U.S. Provisional Application Ser. No. 60/329,248, filed Oct. 12, 2001, and entitled "A Releasable Mounting Arm For A Side View Bus Mirror."

TECHNICAL FIELD

The present invention relates generally to mounting arms for vehicle mirrors, and more particularly, to releasable mounting arms for side view vehicle mirrors.

BACKGROUND ART

Motor vehicles, and in particular larger vehicles such as busses, trucks and the like, require an array of mirrors mounted on exterior surfaces of these vehicles in order to improve the visibility and field of view of the driver in and around the vehicle. These visibility and field of view improvements are intended to increase safety, particularly for pedestrians and children when the vehicle is a school bus. Typically, a vehicle mirror element has a mounting structure integrated therein, such as a staff or pole attached thereto. The mounting structure is secured within or to one end of a mounting arm. The other end of the mounting arm is attached to the body of a vehicle. Alternatively, other vehicle mirror elements have receptacles formed in the body thereof for receipt of one end of the mounting arm. The other end of the mounting arm is secured to the vehicle to attach the mirror to the body of the vehicle.

It is of paramount importance to maintain the position of an adjustable vehicular mirror as the vehicle travels. As is known, during vehicle operation, the mirror can vibrate and move, which can compromise the driver's field of view and/or visibility. This is especially true when the mirrors are mounted at the front end of the vehicle beyond the driver's ability to reach and correct mirror movement while operating the vehicle, such as is encountered with trucks, busses, and larger vehicles of the like. Various mechanisms for reducing mirror vibration have been utilized in the art, however, they can be relatively expensive and have other disadvantages.

As is known, when vehicle mirrors are attached to the vehicle, they typically protrude outwardly from the side of the vehicle to provide the driver with a better field of view to potential blind spots on the front or side of the vehicle, which is the cause of many accidents. However, to provide a broader field of view, the mirror must be mounted with an arm that extends further outwardly from the side of the vehicle, which increases the effective width or length of the vehicle. Additionally, to minimize mirror vibration, the mounting structures are typically configured such that they are stiff and inflexible or have reinforcing structures incorporated into the mounting structure.

Because these mirrors are typically mounted to larger and wider vehicles such as trucks, busses, and the like, the mirrors are more susceptible to inadvertently striking various objects, such as mailboxes, trees, other cars, etc. This contact between the mirror and/or mirror assembly can cause significant damage to the mirror, particularly because of the stiffness of the mounting structures. Thus, when a mirror strikes an object at a large enough force, the mirror and/or the mounting arm, can be damaged, which necessitates repair or replacement of the mirror and/or the mounting arm. Additionally, depending upon the force at which the mirror is struck, the mirror can cause the side of the vehicle to be dented, damaged, ripped or torn off, which necessitates repair of the vehicle itself and increases the cost to operate the vehicle. Accordingly, it would be desirable to provide a vehicular mirror that provides sufficient field of view, and overcomes these longevity problems.

SUMMARY OF THE INVENTION

Accordingly, it is an object of the present to provide a mirror assembly for a vehicle, including a mounting arm that is releasable in one direction upon application of a predetermined amount of force to minimize damage to the mirror and/or the vehicle to which it is attached.

It is a further object of the present invention to provide a mirror assembly for a vehicle, including a mounting arm that is releasable in one of two independent directions upon application of a predetermined amount of force in a given direction to minimize damage to the mirror and/or the vehicle to which it is attached.

It is still another object of the present invention to provide a vehicle mirror assembly that increases the life of a vehicle and the mirror assembly.

In accordance with the above and the other objects of the present invention, a vehicle mirror assembly is provided. The vehicle mirror assembly includes a bracket portion for attachment to a vehicle, such as a bus, truck or the like. The bracket is in communication with a first end of a mounting arm. The mounting arm has a middle portion that extends away from the attachment bracket to and terminates at a second end that is located remote from the first end. The second end of the mounting arm is in communication with a vehicle mirror. The assembly includes a release mechanism, which allows the mounting arm to move with respect to the bracket when the mounting arm is subjected to a predetermined force.

Other features and advantages of the present invention will become apparent from the following description of the invention when viewed in connection with the accompanying drawings.

BRIEF DESCRIPTION OF THE DRAWINGS

FIG. 1 is a perspective view of a school bus having a pair of vehicle mirror assemblies attached thereto in accordance with the present invention;

FIG. 3 is a top view of a vehicle mirror assembly attached to a vehicle and illustrating movement of the assembly between a secured position and a released position (shown in phantom) in accordance with the present invention;

FIG. 4 is a side view of a vehicle mirror assembly in accordance with an embodiment of the present invention;

FIG. 5 is a cross-sectional view of the vehicle mirror assembly of FIG. 4 in the direction of the arrows labeled 5—5;

FIG. 6 is an illustration of a vehicle mirror assembly and release mechanism in a released position in accordance with the present invention;

FIG. 7 is a cross-sectional view of the vehicle mirror assembly of FIG. 6 in the direction of the arrows labeled 7—7;

FIG. 8 is an exploded view of a mounting bracket and base portion of the vehicle mirror assembly shown in FIG. 5 in the direction of the arrows labeled 8—8;

FIG. 9 is a perspective view of another embodiment of a vehicle mirror assembly in accordance with the present invention;

FIG. 10 is a perspective view of the vehicle mirror assembly of FIG. 9 with a first release mechanism in a released position in accordance with the present invention;

FIG. 11 is a perspective view of the vehicle mirror assembly of FIG. 9 with a second release mechanism in a released position in accordance with the present invention;

BRIEF DESCRIPTION OF THE PREFERRED EMBODIMENT

Figure 2:
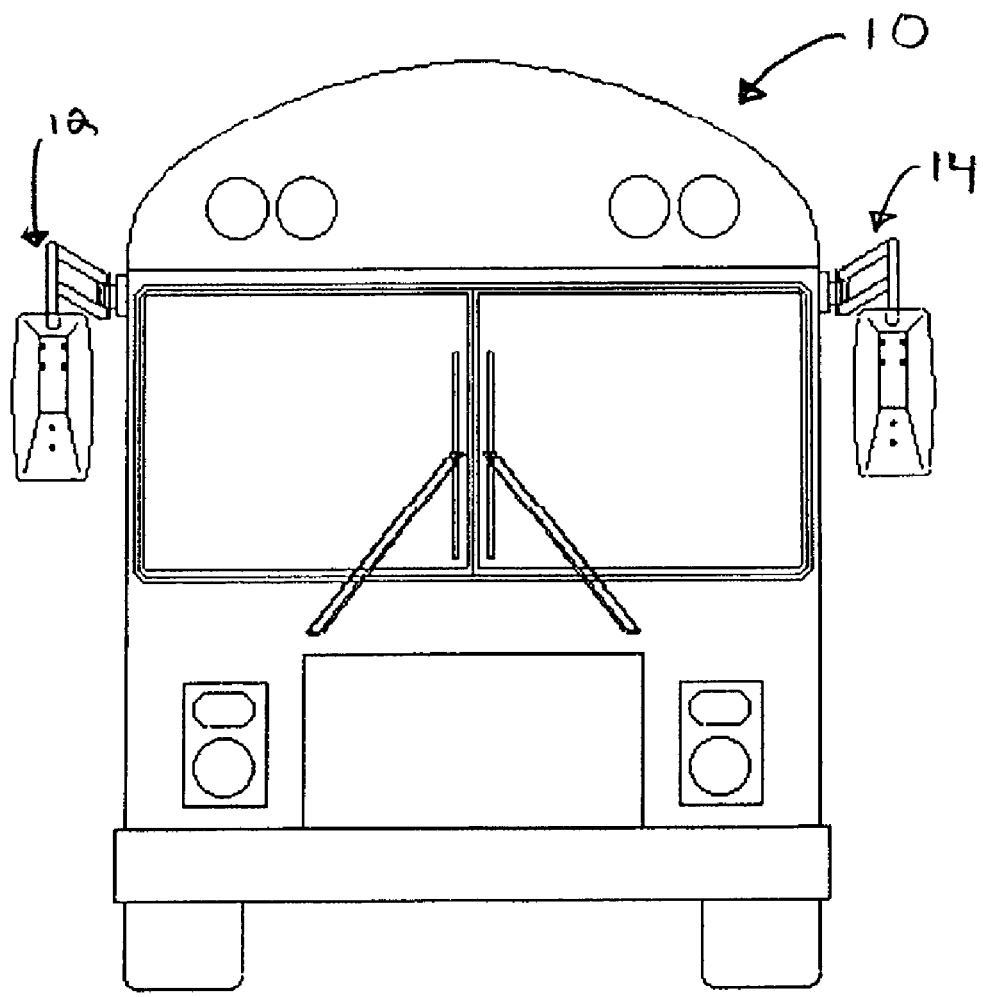
FIG. 2 is a front view of a school bus having a pair of vehicle mirror assemblies attached thereto in accordance with the present invention.

Referring now to FIGS. 1 and 2, which illustrate an exemplary application for the mirror assembly of the present invention. As shown, a school bus 10 has a pair of side view mirrors 12, 14 mounted thereto in accordance with the present invention. It will be understood that while the present invention may be utilized with side view mirrors, it may also be utilized with a variety of other mirrors, including cross-view mirrors, as are known in the art. Further, it will be understood that the mounting structure of the present invention may be utilized in connection with a variety of other mirror types. Moreover, while the present invention is illustrated by way of example as mounted to a school bus, it will be understood that the disclosed mirror assembly can be attached to and utilized with other large vehicles, such as trucks, tractors, conventional vehicles, or any other type of vehicle.

Referring now to FIGS. 3 through 7, which illustrate an embodiment of a vehicle mirror assembly 20 in accordance with the present invention. As shown, the vehicle mirror assembly 20 includes a mounting bracket 22, a mounting arm 24, and a vehicle mirror 26. The mounting bracket 22 has a plurality of holes 30 formed therein through which a respective securing mechanism is intended to pass to attach the mirror assembly 20 to a vehicle. The mounting bracket 22 is preferably a separate component from the mounting arm 24. The mounting bracket 22 engages a base portion 28 of the mounting arm 24, as discussed in more detail below in connection with FIG. 8. Alternatively, other mechanisms for attaching the vehicle mirror 26 to a vehicle may be utilized.

The vehicle mirror assembly 20 also includes a swing arm 32 extending generally away from the mounting bracket 22. The swing arm 32 is preferably secured to the base portion 28. However, it will be understood that the swing arm 32 may be a separate structure from the base portion 28 and may move independently thereof. The mounting arm 24 is preferably aligned parallel to the swing arm 32 at least along the length of the swing arm 32. The mounting bracket 22 is preferably attached to the front of the vehicle and can be constructed of a variety of materials, including metal or plastic.

In one embodiment, the mounting arm 24 includes a pair of parallel spaced apart tubes 25. The tubes 25 are preferably filled with foam in order to dampen vibration of the mounting arm while the vehicle it is attached to is in motion. It will be understood that a variety of other vibration dampening items or materials may be utilized. The mounting arm 24 is preferably secured at one end 34 to the vehicle mirror 26 and at the base portion 28 to the mounting bracket 22. The mounting arm 24 has a middle portion 38 that extends between the base portion 28 and the end 34. The mounting arm 24 is preferably constructed of a metal material, such as aluminum or steel. However, a variety of other materials may be utilized, including a polymer, such as a plastic.

The middle portion 38 preferably includes a bend 40 and an elbow 41 formed therein. The bend 40 causes the mounting arm 26 to extend generally upward and outward with respect to ground or the vehicle as the mounting arm 26 extends from the base portion 28 to the bend 40. The elbow 41 is formed in the middle portion 38 of the mounting arm 26 such that the end 34 extends generally downwardly so that the vehicle mirror 26 can be mounted thereon and is visible to the driver. However, it will be understood that the middle portion 38 may take on a variety of other configurations, including straight.

The mounting arm 24 is preferably in pivotal engagement with the base portion 28 by way of a pivot mechanism 42. In one embodiment, the pivot mechanism 42 is comprised of a pin 48 that connects the swing arm 32 with the base portion 28 and allows relative rotation therebetween. The end 34 of the mounting arm 24 is secured or otherwise affixed to the vehicle mirror 26. The end 34 is preferably telescopically received in an opening 44 formed in a housing 46 for the vehicle mirror 26. AS is well known, vehicle mirrors use a variety of mounts or other structures extending therefrom to attach or otherwise secure the vehicle mirror 26 to an end of the mounting arm 24.

The vehicle mirror assembly 20 in accordance with one embodiment of the present invention includes a release mechanism 50. The release mechanism 50 allows the mounting arm 24 to rotate with respect to the base portion 28 about the pivot mechanism 42 when a predetermined force F is applied to the mounting arm 24 or the vehicle mirror 26. As best shown in FIG. 3, the mounting arm 24 is moveable between an unreleased position (FIGS. 4 and 5) and a released position (FIGS. 6 and 7). It will be appreciated that the release mechanism 50 can be configured to take on a variety of different configurations with only an exemplary configuration being described below. For example, while the pivot mechanism 42 is preferably located adjacent the base portion 28 of the mounting arm 24, it will be appreciated that it may be located along any portion of the structure between the base portion 28 and the vehicle mirror 26, such that the vehicle mirror 26 can rotate or pivot with respect to the vehicle to which it is attached. Alternatively, the mounting arm 24 can be omitted entirely as desired.

In one embodiment, the release mechanism 50 includes the swing arm 32, a magnetic portion 52 located on an end 54 of the swing arm 32, and a corresponding metal portion 56 attached to the mounting arm 24. The metal portion 56 is intended to mate with the magnetic portion 52 to secure the mounting arm 24 to the swing arm 32 due to the magnetic attraction force therebetween. It will be understood that the magnetic portion 52 and the metal portion 56 for engaging the magnetic portion 52 may be located in different locations. For example, their positions could be switched such that the magnetic portion 52 is located on the swing arm 32 and the metal portion 56 is located on the mounting arm 24. In another embodiment, the release mechanism 50 can include a non-magnetic attachment such as a releasable clip or latch.

In an unreleased position, as shown in FIGS. 4 and 5, the mounting arm 24 is rotated about the pivot mechanism 42 such that the mounting arm 24 is generally parallel to and aligned with the swing arm 32. In this configuration, the magnetic portion 52, which is located at the end 54 of the swing arm 32, is locked to the corresponding metal portion 56 due to magnetic force. It will be understood that the location of the magnetic portion 52 on the swing arm 32 and the metal portion 56 on the mounting arm 24 can be configured in a variety of different ways depending upon the desired amount of force required to overcome the magnetic force and move the mounting arm 24 to a released position. The greater the length of the swing arm 32, the greater the force F that will be required to overcome the magnetic force. Additionally, any size magnet may be utilized depending upon the desired amount of force required to separate the magnetic portion 52 from the metal portion. Moreover, in one embodiment, the metal portion 56 is disposed in a channel 58 formed in the base portion 28. Further, when the mounting arm 24 is in an unreleased position, the swing arm 32 is also received in the channel 58 such that the upper portion of the swing arm 32 is flush with the opposing sides of the base portion 28.

Once the magnitude of the predetermined force to separate the magnetic portion 52 from the corresponding metal portion 56 has been determined and the location of these portions 52, 56 and the strength have also been determined, the vehicle mirror assembly 20 is assembled and mounted to a structure, such as a vehicle, by way of the mounting bracket 22. Upon application of a force greater than the predetermined force F to the mounting arm 24 and/or the vehicle mirror 26, the metal portion 56 separates from the magnetic portion 52 allowing the mounting arm 24 to rotate about the pivot mechanism 42 while the swing arm 32 remains in its fixed position. This released position is illustrated best in FIGS. 6 and 7. This releasing capability allows the mounting arm 24 to swing away if it is struck by a force such as an opposing car, a mail box, a tree, a telephone pole, or the like without destroying the vehicle mirror assembly 20 or the structure to which the mounting bracket 32 is attached, such as a school bus 10 or other vehicle.

FIG. 8 illustrates the attachment of the base portion 28 to the mounting bracket 22. As shown, the mounting bracket includes a plurality of holes 30, which allow attachment of the bracket 22 to a vehicle. The mounting bracket 22 also includes a channel 120, which is intended to communicate with a corresponding flange 122 formed on the base portion 28. The channel 120 is configured such that the distance between the opposing sides 124 and 126 decreases from the top side 128 of the bracket 22 to the bottom side 130 of the mounting bracket 22. In one embodiment, the side 124 converges toward the side 126, while the side 126 remains generally parallel from the top side 128 to the bottom side 130. Alternatively, both sides 124, 126 can converge to decrease the distance therebetween. The sides 132, 134 of the flange 122 have a corresponding shape to the respective side 124, 126 of the channel 120.

The reduction in distance between the sides 124, 126 of the channel 120 assists in retaining the base portion 28 firmly secured to the mounting bracket 22 and thus the vehicle. Additionally, a securing screw 136 is included in the mounting bracket 22 and is intended to engage a detent 138 formed in the flange 122, once the flange 122 is positioned within the channel 120.

Referring now to FIGS. 9 through 13 which illustrate another embodiment of a vehicle mirror assembly 60 in accordance with the present invention. The vehicle mirror assembly 60 is intended for the same purpose, as discussed above in connection with the vehicle mirror assembly 20, namely attachment to a vehicle, including a large vehicle such as a bus, truck or the like. The vehicle mirror assembly 60 includes a base portion 62, a mounting arm 64, and a vehicle mirror 66. The base portion 62 has a mounting portion 68 with a plurality of mounting holes 70 formed therein through which a respective securing mechanism is intended to pass to attach the vehicle mirror assembly 60 to a vehicle. The base portion 62 also includes a pivot mechanism 72 and a swing arm 74 extending generally outwardly from the pivot mechanism 72. The pivot mechanism 72, in one embodiment, includes a pin 73 that pivotally connects the base portion 62 with the mounting portion 68. In this embodiment, the mounting portion 68 is aligned perpendicular to the swing arm 74 and can be attached to the side of the vehicle. However, the mounting portion 68 can have a variety of different orientations with respect to the swing arm 74.

The mounting arm 64 includes a first end 76 which is pivotably attached to the base portion 62 by the pivot mechanism 72 and a second end 78 opposing the first end 76. The mounting arm 64 has a middle portion 80 that extends between the first end 76 and the second end 78. The middle portion 80 preferably has a curved configuration such that the second end 78 extends generally perpendicularly with respect to the first end 76. In one embodiment, the mounting arm 64 is comprised of a plurality of tubes 82 that are welded to the mounting arm 64 to provide additional strength. The middle portion 80 may take on a variety of configurations, such as straight and may be constructed of a variety of materials, including plastic. Alternatively, the mounting arm 64 can be comprised of a single tube or instead can be eliminated from the vehicle mirror assembly altogether. In one embodiment, the tubes 82 are filled with foam in order to provide increased vibration dampening characteristics. However, other structure for minimizing vibration may also be utilized. Filling the tubes with foam also minimizes any internal condensation within the tubes and thus prevents premature rusting. This further eliminates the need to drill holes in the tubes for drainage purposes.

The vehicle mirror 66 is preferably a side view mirror, but can be any of a variety of other types of mirrors. The vehicle mirror 66 has a housing 84 with a front portion 86 that is open such that one or more reflective mirror lenses are disposed therein. The housing also includes a back portion 88 opposing the front portion 86. The back portion 88 preferably has a reflector 90 disposed thereon. The mirror housing 84 includes a receptacle 92 formed therein for receipt of the second end 78 of the mounting arm 64. The receptacle 92 is preferably formed adjacent the bottom end of the housing 84. It will be understood that depending upon how the mirror assembly 60 is attached to the vehicle, the top end 94 could also be oriented as the bottom end.

Figure 12:
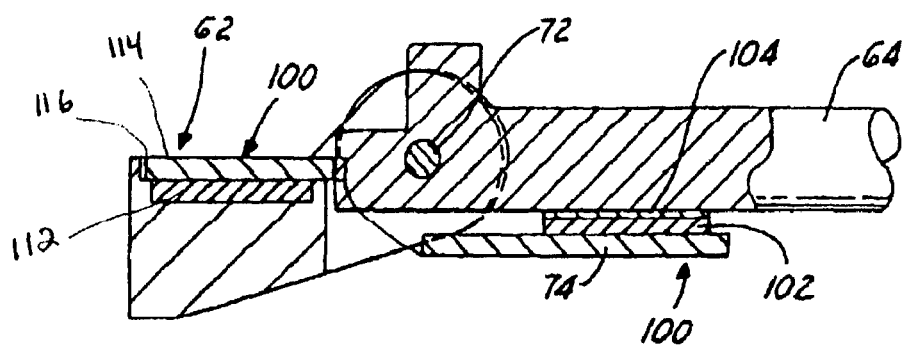
FIG. 12 is a cross-sectional view of a vehicle mirror assembly with both the first release mechanism and the second release mechanism in an unreleased positions in accordance with the present invention.

In one embodiment, the vehicle mirror assembly 60 is electronically controlled such that the one or more lenses on the front portion 86 of the mirror 66 can be electronically adjusted from inside the vehicle to alter or change the line of sight and/or field of view. Electronic communication between the lenses and the inside of the vehicle is effectuated by a plurality of wires encased within a cord 96, which extends from the mounting bracket 62 and terminates in a control box 98, which is preferably located within the vehicle and can be operated by user. The wires are in communication with the lens to control their movement. FIGS. 9 and 12 illustrate the vehicle mirror assembly 60 in an unreleased position.

Referring now to FIG. 10, which illustrates the vehicle mirror assembly 60 in a rearward released position. As shown, the vehicle mirror assembly 60 includes a rearward release mechanism 100. The rearward release mechanism 100 includes a magnetic portion 102 attached to the swing arm 74 and a corresponding metal portion 104 secured to the mounting arm 64. In the released position, shown in FIG. 10, a force sufficient to separate the magnetic portion 102 from the corresponding metal portion 104 has been applied to the mounting arm 64 in a generally rearward direction such that the mounting arm 64 and the vehicle mirror 66 pivot rearwardly with respect to the front of the vehicle while the mounting bracket 62 remains secured to the vehicle.

The configuration of the disclosed vehicle mirror assembly 60 allows the mounting arm 64 to break away from the mounting bracket 62 temporarily without damaging the vehicle mirror assembly when a force of a magnitude strong enough to overcome the magnetic force of the magnetic portion 102 is applied to the mounting arm 64 and/or the vehicle mirror 66. The mirror assembly 60 is then returned to its unreleased position by moving the mounting arm 64 until the magnetic portion 102 engages the metal portion 104 and retains them through the strength of the magnetic force.

Figure 13:
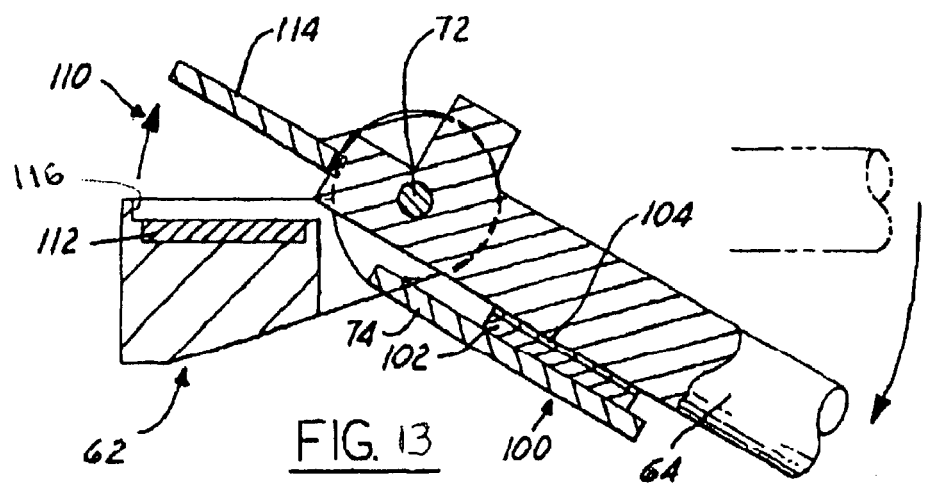
FIG. 13 is a cross-sectional view of a portion of a vehicle mirror assembly illustrating a second release mechanism in a released position in accordance with the present invention.

Referring now to FIGS. 11 through 13 which illustrate a forward release mechanism 110 in accordance with the present invention. The forward release mechanism 110 allows the mounting arm 64 to pivot forwardly toward the front of the vehicle in the event that a force greater than a predetermined force is applied in a generally forward direction to the mounting arm 64 or the vehicle mirror 66. The forward release mechanism 110 provides the same features and benefits that the rearward release mechanism 100, as described above, provides. The forward release mechanism 110 includes a magnetic portion 112 formed within the mounting bracket 62 adjacent the mounting portion 68. The magnetic portion 112 is engageable with a flange portion 114 that is located inwardly of the pivot mechanism 72 (between the mounting portion 68 and the pivot mechanism 72) and is moveable between an unreleased position (FIG. 11) and a released position (FIG. 12). When the forward release mechanism 110 is in an unreleased position, the flange portion 114 rests within a recess 116 formed in the mounting bracket 62 and engages the magnetic portion 112 and is retained there due to magnetic forces. When the magnetic portion 112 is engaging the flange portion 114, the mounting arm 64 is prevented from pivoting forwardly about the pivot mechanism 72. The unreleased position of the forward released mechanism 110 is best shown in FIGS. 10 and 12.

Referring now to FIGS. 11 and 13 which illustrate the forward release mechanism 110 in a released position such as when a force greater than the force of the magnetic portion 112 is applied to the mounting arm 64 and/or the vehicle mirror 66. As shown, when a force is applied in a forward direction on the mounting arm 64 and/or the vehicle mirror 66, the mounting arm 64 pivots forwardly toward the front of the vehicle about the pivot mechanism 72 such that the force holding the flange portion 114 to the magnetic portion 112 is overcome and the mounting arm 64 pivots against the side of the vehicle.

In one embodiment, when a force larger than the force of the magnetic portion 112 is applied to the mounting arm 64 in a generally rearward direction, the rearward release mechanism 100 allows the mounting arm 64 to pivot rearward with respect to the mounting bracket 62. When the rearward release mechanism 100 is activated or moved to the unreleased position, the forward release mechanism 110 remains in an unreleased position. When a force larger than the force of the magnetic portion 112 is applied to the mounting arm 64 in a forward direction, the forward release mechanism 110 allows the mounting arm 64 to pivot forwardly with respect to the mounting bracket 62. When the forward release mechanism 110 is activated or moved to the unreleased position, the rearward release mechanism 100 pivots with the mounting arm 64. The swing arm 74 and the flange 114 thus move with the pivot mechanism 72 when the forward release mechanism 110 is activated. Depending upon the orientation and attachment of the vehicle mirror assembly 60, the rearward release mechanism 100 and the forward release mechanism 110 can be switched such that the rearward release mechanism 100 is actuated upon a sufficient forward force and the forward release mechanism 110 is activated by a sufficient rearward force. The terms forward and rearward are thus for illustrative purposes only.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed:

1. A vehicle mirror assembly comprising:
   a bracket for attachment to a vehicle;
   a mounting arm having a first end in communication with said bracket and a second end remote from said first end;
   at least one mirror having a reflective mirror being secured at said second end, said mounting arm of sufficient length such that said reflective mirror can be seen from inside said vehicle through a windshield of said vehicle when said mounting arm is in a normal position; and
   a release mechanism for allowing said mounting arm to move with respect to said mounting bracket when a force greater than a predetermined force is applied to said mounting arm, wherein said release mechanism allows said mounting arm to move in a generally rearward direction with respect to the vehicle;
   wherein said release mechanism includes a magnet that keeps said mounting arm in said normal position and allows said mounting arm to move to a released position upon application of said force that is greater than said predetermined force, wherein a magnetic portion in communication with a metal portion on said mounting arm keeps said mounting arm in an unreleased position, wherein said magnetic portion is attached to a swing arm extending from said mounting bracket.

2. The mirror assembly of claim 1, wherein said release mechanism allows said mounting arm to pivot in a generally forward direction with respect to the vehicle.

3. The mirror assembly of claim 1, wherein said magnetic portion is attached adjacent said first end of said mounting arm and said metal portion is attached adjacent an attachment portion of said mounting bracket.

4. The mirror assembly of claim 1, wherein said mounting arm is pivotally connected to said bracket.

5. A mirror assembly for attachment to a vehicle and extending generally outwardly therefrom, comprising:
   a bracket for attaching the mirror assembly to the vehicle;

a mounting arm in communication with said bracket at a first end and at least one mirror housing having an associated minor attached to said mounting arm at a second end;

at least one release mechanism allowing said mounting arm to move with respect to said bracket from a normal unreleased position to a released position when subjected to a force of a predetermined magnitude; and a pivot mechanism that allows said mounting arm to move from said normal unreleased position to said released position, wherein said release mechanism includes a metallic flange portion attached to said mounting arm and magnet located in said bracket for securing said flange to maintain the assembly in said unreleased position.

6. The mirror assembly of claim 5, wherein the vehicle is a school bus.

7. The mirror assembly of claim 5, wherein said at least one mirror is a cross-view mirror.

8. The mirror assembly of claim 5, further comprising:

a pair of release mechanisms, with one release mechanism allowing said mounting arm to move in a forward direction and a second release mechanism allowing said mounting arm to move in a rearward direction.

9. The mirror assembly of claim 5, wherein said release mechanism includes a swing arm attached to said bracket, said swing arm having a magnet secured thereto for engaging a metal structure on said mounting arm to maintain the assembly in said unreleased position.

10. The mirror assembly of claim 9, wherein said swing arm extends generally perpendicularly from a mounting portion of said bracket.

11. A minor assembly comprising:

a mounting portion allowing attachment of the mirror assembly to a structure;

at least one mirror housing in communication with said mounting portion, said minor housing having a mirror housed therein;

a mounting arm extending between and connecting said mounting portion with said at least one mirror housing;

a release mechanism mounted at least a portion of which is disposed on said mounting arm for allowing said at least one mirror to move with respect to said mounting portion from a normal unreleased position to a released position; and a pivot mechanism that allows said mounting arm to move from said normal unreleased position to said released position;

wherein said release mechanism includes a swing arm attached to said bracket, said swing arm having a magnet secured thereto for engaging a metal structure on said mounting arm to maintain the assembly in said unreleased position.

12. The mirror assembly of claim 11, wherein said structure to which said mounting portion is attached is a vehicle.

13. The mirror assembly of claim 12, wherein said vehicle is a school bus.

14. The mirror assembly of claim 11, wherein said release mechanism moves in a forward direction.

15. The mirror assembly of claim 11, wherein said release mechanism moves in a rearward direction.

16. The mirror assembly of claim 11, further comprising a pair of release mechanisms, said first release mechanism allowing the mirror assembly to move in a first released direction and a second release mechanism allowing the mirror in a second released direction.

17. The mirror assembly of claim 16, wherein said first release mechanism includes a magnet portion in communication with a mounting arm that extends between said mounting portion and said at least one mirror to lock the mounting arm and maintain the assembly in said unreleased position.

* * * * *

UNITED STATES PATENT AND TRADEMARK OFFICE
CERTIFICATE OF CORRECTION

PATENT NO. : 7,014,327 B2
DATED : March 21, 2006
INVENTOR(S) : William Schmidt and Daniel Swain It is certified that error appears in the above-identified patent and that said Letters Patent is hereby corrected as shown below:

Column 8,
Line 34, after "mirror" insert -- housing --.

Signed and Sealed this

Sixteenth Day of May, 2006

JON W. DUDAS
*Director of the United States Patent and Trademark Office*